United States Patent
Zhou et al.

(10) Patent No.: US 11,823,633 B2
(45) Date of Patent: Nov. 21, 2023

(54) MINI-LED BACKLIGHT MODULE AND DISPLAY DEVICE

(71) Applicant: TCL CHINA STAR OPTOELECTRONICS TECHNOLOGY CO., LTD., Shenzhen (CN)

(72) Inventors: Kaifeng Zhou, Shenzhen (CN); Meng Wang, Shenzhen (CN)

(*) Notice: Subject to any disclaimer, the term of this patent is extended or adjusted under 35 U.S.C. 154(b) by 438 days.

(21) Appl. No.: 17/045,493

(22) PCT Filed: Aug. 4, 2020

(86) PCT No.: PCT/CN2020/106828
§ 371 (c)(1),
(2) Date: Oct. 6, 2020

(87) PCT Pub. No.: WO2022/007077
PCT Pub. Date: Jan. 13, 2022

(65) Prior Publication Data
US 2023/0154417 A1 May 18, 2023

(30) Foreign Application Priority Data
Jul. 7, 2020 (CN) .......................... 202010645298.7

(51) Int. Cl.
*G09G 3/00* (2006.01)
*G09G 3/34* (2006.01)

(52) U.S. Cl.
CPC ..... *G09G 3/3406* (2013.01); *G09G 2320/045* (2013.01); *G09G 2330/08* (2013.01)

(58) Field of Classification Search
CPC ............... G09G 3/3406; G09G 3/3426; G09G 2320/064; G09G 2330/021
See application file for complete search history.

(56) References Cited

U.S. PATENT DOCUMENTS

| | | | |
|---|---|---|---|
| 2015/0042925 A1* | 2/2015 | Hu | ........................ H05B 45/54 315/192 |
| 2015/0156846 A1 | 6/2015 | Cao | |
| 2021/0150975 A1* | 5/2021 | Li | ........................ G09G 3/3233 |

FOREIGN PATENT DOCUMENTS

| | | |
|---|---|---|
| CN | 101080118 A | 11/2007 |
| CN | 202049714 U | 11/2011 |
| CN | 103354086 A | 10/2013 |
| CN | 103606884 A | 2/2014 |
| CN | 203522153 U | 4/2014 |
| CN | 108182911 A | 6/2018 |
| CN | 109346016 A | 2/2019 |
| CN | 110824766 A | 2/2020 |
| CN | 110956922 A | 4/2020 |
| KR | 100725496 B1 | 6/2007 |

* cited by examiner

*Primary Examiner* — Michael A Faragalla

(57) ABSTRACT

The present application provides a mini light-emitting diode (mini-LED) backlight module and a display device. The mini-LED backlight module includes a plurality of separate backlight regions. Each of the separate backlight regions is provided with at least two LEDs. Each branch of the LEDs is connected to a protective circuit. The protective circuit includes a rectifier module connected in series with the LED, and a control module connected to the rectifier module and an output end of the LED.

14 Claims, 5 Drawing Sheets

MINI-LED BACKLIGHT MODULE AND DISPLAY DEVICE

FIELD OF THE DISCLOSURE

The present application relates to display technologies, and more particularly to a mini-LED backlight module and a display device.

DESCRIPTION OF RELATED ARTS

In recent years, taken as backlight sources used in liquid crystal display (LCD) panels, mini-LEDs can significantly improve display quality in contrast, brightness and etc., and thus has attracted more and more attention from the market. Mini-LED backlight technology is to bond a LED chip to a backplate with a driving circuit, and realizes dynamic backlight by controlling LED dimming in separate regions using the driving circuit. The more the separate or divided regions for mini-LED backlight, the greater the number of LED lights and the more sophisticated the backlight control. With this backlight technology, LCDs can realize a thin appearance and achieve the display quality with high brightness and ultra-high contrast (achieving pure black).

Technical Problems

Because of brightness and cost considerations in applying Mini-LED technology, a plurality of LEDs are connected in series in a single region of LEDs for light emission. Once the LED is short-circuited or disconnected, there may be situations where some lights are burned due to over current or large-area dim lights occur in a divided region, thereby affecting long-term reliability of products.

Technical Solutions

The present application provides a mini-LED backlight module and a display device, for solving the technical problem that some lights are burned due to over current or large-area dim lights occur in divided or separate backlight regions, caused when the LED is short-circuited in an existing mini-LED backlight module.

To solve above problems, the technical solutions provided in the present application are described below.

The present application provides a mini-LED backlight module, including a plurality of separate backlight regions, each of the separate backlight regions provided with at least two LEDs, each branch of the LEDs connecting to a protective circuit, the protective circuit including:
 a rectifier module, connected in series with the LED and configured to moderate a branch current of the LED; and
 a control module, connected to the rectifier module and an output end of the LED, and configured to obtain a voltage of the output end of the LED and based on the voltage of the output end of the LED, to enable the rectifier module to moderate the branch current of the LED to maintain the branch current of the LED within a configured range.

In the mini-LED backlight module provided in the present application, the branch of the LED includes a first high-voltage input end and a first low-voltage output end, the rectifier module includes a first thin-film transistor (TFT), the first TFT and the LED are connected in series between the first high-voltage input end and the first low-voltage output end, and a control terminal of the first TFT is connected to the control module.

In the mini-LED backlight module provided in the present application, the control module includes a second high-voltage input end, a second low-voltage output end, and a second TFT and a third TFT connected in series between the second high-voltage input end and the second low-voltage output end, a second control terminal of the second TFT is connected to the second high-voltage input end, a third control terminal of the third TFT is connected to the output end of the LED, and the first control terminal is connected to a node between the second TFT and the third TFT.

In the mini-LED backlight module provided in the present application, a first pin of the first TFT is connected to the first high-voltage input end, a second pin of the first TFT is connected to an input end of the LED, a protective resistor is connected in series between the first low-voltage output end and the output end of the LED, and the third control terminal is connected to a node between the protective resistor and the output end of the LED.

In the mini-LED backlight module provided in the present application, an input end of the LED is connected to the first high-voltage input end, the output end of the LED is connected to a first pin of the first TFT, a second pin of the first TFT is connected to the first low-voltage output end, and the third control terminal is connected to a node between the first TFT and the output end of the LED.

In the mini-LED backlight module provided in the present application, a third pin of the second TFT is connected to the second high-voltage input end, a fourth pin of the second TFT is connected to a fifth pin of the third TFT, and a sixth pin of the third TFT is connected to the second low-voltage output end.

In the mini-LED backlight module provided in the present application, the first high-voltage input end and the second high-voltage input end have a same voltage and are connected in parallel.

In the mini-LED backlight module provided in the present application, the two LEDs are connected in parallel, the first low-voltage output end on the branch of one of the two LEDs is connected to the first low-voltage output end on the branch of the other one of the two LEDs, and the first high-voltage input end on the branch of one of the two LEDs is connected to the first high-voltage input end on the branch of the other one of the two LEDs.

In the mini-LED backlight module provided in the present application, the two LEDs are connected in series, and the first low-voltage output end on the branch of one of the two LEDs is connected to the first high-voltage input end on the branch of the other one of the two LEDs.

The present application further provides a display device. The display device includes a display panel and the aforedescribed mini-LED backlight module. The display panel is disposed at one side of the mini-LED backlight module.

Beneficial Effects

The beneficial effects of the present application are described below. By deploying the protective circuit on each branch of the LEDs, it is avoided in the present application that some lights are burned due to over current or large-area dim lights occur in divided or separate backlight regions, caused when the LED is short-circuited. Specifically, a voltage of the output end of the LED is obtained in real time by means of the control module, and based on the voltage of the output end of the LED, the rectifier module is enabled to moderate the branch current of the LED to maintain the branch current of the LED within a configured range. A close-loop adjustment in real time for the branch current of the LED is realized. Affection of a short-circuited LED on other LEDs in the mini-LED backlight module is avoided.

DESCRIPTION OF DRAWINGS

For explaining the technical solutions used in the existing arts or the embodiments more clearly, the appended figures to be used in describing the existing arts or the embodiments will be briefly introduced in the following. Obviously, the appended figures described below are only some of the embodiments of the invention, and those of ordinary skill in the art can further obtain other figures according to these figures without making any inventive effort.

DESCRIPTION OF EMBODIMENTS OF THE DISCLOSURE

Figure 1:
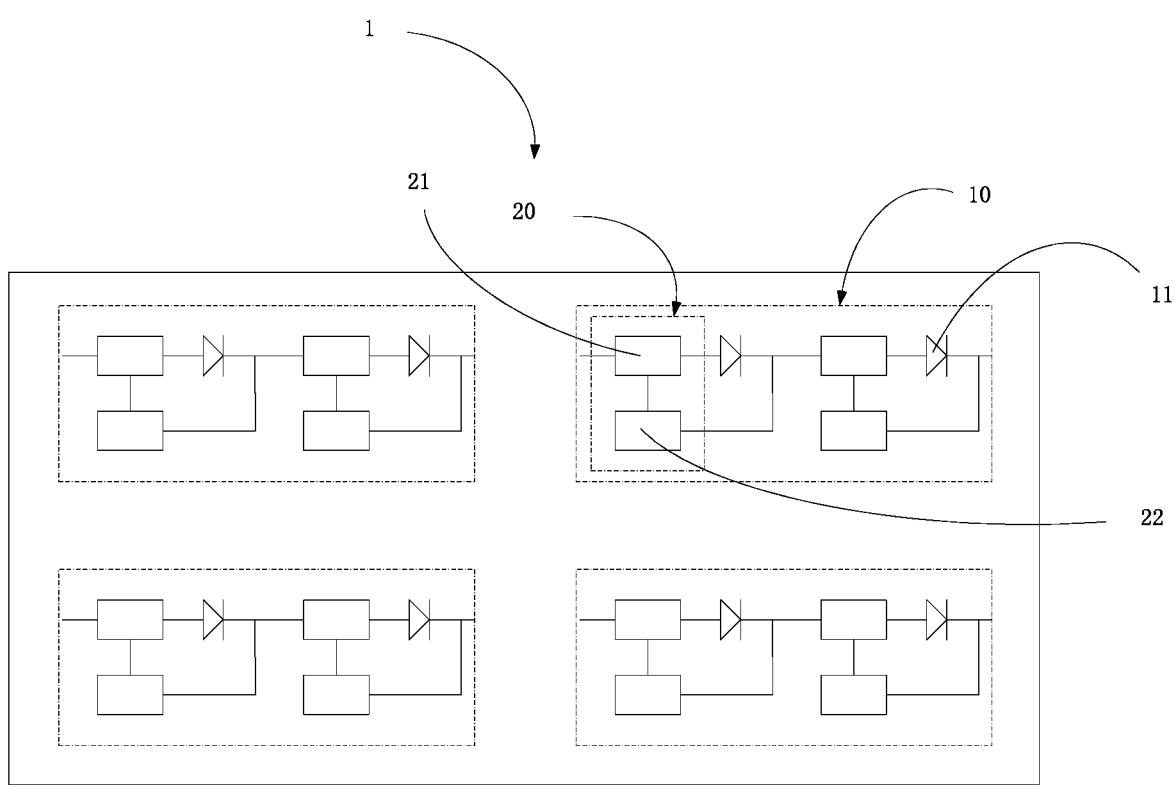
FIG. 1 is a schematic diagram illustrating a first type of mini-LED backlight module in an embodiment of the present application.

The following descriptions for the respective embodiments are specific embodiments capable of being implemented for illustrations of the present invention with referring to the appended figures. In describing the present invention, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present invention for ease of understanding, but are not intended to limit the present invention. In the appended figures, units with similar structures are indicated by same reference numbers.

In the description of the present application, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicated orientation or positional relationship are based on the relationship of the position or orientation shown in the drawings, which is only for the purpose of facilitating description of the present application and simplifying the description, but is not intended to or implied that the device or element referred to must have a specific orientation, and be constructed and operated in a particular orientation. Therefore, it should not be construed as a limitation of the present application. In addition, the terms "first" and "second" are used for descriptive purposes only, and should not be taken to indicate or imply relative importance, or implicitly indicate the indicated number of technical features. Thus, by defining a feature with "first" or "second", it may explicitly or implicitly include one or more features. In the description of the present application, "a plurality" means two or more unless explicitly defined.

In the description of the present application, it should be noted that unless otherwise explicitly specified or limited, the terms "installed", "connected", and "connection" should be construed broadly, for example, a fixed connection, a removable connection, or integrally connected. These terms may be directed to a mechanical connection, and may also be directed to an electrical connection or communication. Moreover, these terms can be directed to "directly attached", "indirectly connected" through an intermediate medium, and may be directed to "internally communicated" with two components or the "interaction relationship" between two components. For persons skilled in the art, they can understand the specific meaning of the terms in the present application based on specific conditions.

In the present application, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

The following disclosure provides a plurality of different embodiments or examples to implement different structures of this application. To simplify the disclosure of this application, the following describes components and settings in particular examples. Certainly, the examples are merely for illustrative purposes, and are not intended to limit this application. In addition, in this application, reference numerals and/or reference letters may be repeated in different examples. This repetition is for the purpose of simplicity and clarity, and does not in itself indicate a relationship between the various embodiments and/or settings that are discussed. In addition, this application provides examples of various particular processes and materials, but a person of ordinary skill in the art will recognize that other processes and/or materials may be applied and/or used.

The technical solutions of the present application will be described with reference to embodiments as follows.

Figure 2:
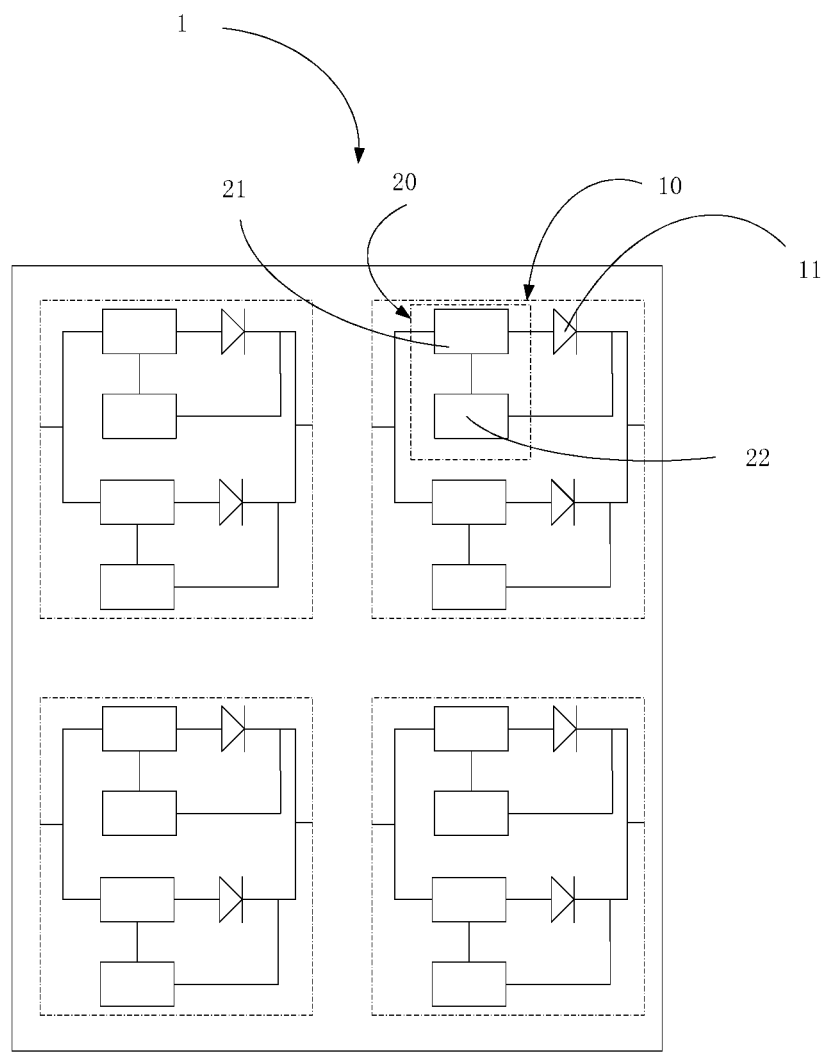
FIG. 2 is a schematic diagram illustrating a second type of mini-LED backlight module in an embodiment of the present application.

The present application provides a mini light-emitting diode (mini-LED) backlight module 1. As shown in FIGS. 1 and 2, the mini-LED backlight module includes a plurality of separate backlight regions 10. Each of the separate backlight regions 10 is provided with at least two LEDs 11. Each branch of the LEDs 11 is connected to a protective circuit 20. The protective circuit 20 includes:

a rectifier module 21, connected in series with the LED 11 and configured to moderate a branch current of the LED 11; and a control module 22, connected to the rectifier module 21 and an output end of the LED 11, and configured to obtain a voltage of the output end of the LED 11 and based on the voltage of the output end of the LED 11, to enable the rectifier module 21 to moderate the branch current of the LED 11 to maintain the branch current of the LED 11 within a configured range.

It can be understood that taken as backlight sources used in liquid crystal display (LCD) panels, mini-LEDs can significantly improve display quality in contrast, brightness and etc., and thus has attracted more and more attention from the market. Mini-LED backlight technology is to bond a LED chip to a backplate with a driving circuit, and realizes dynamic backlight by controlling LED 11 dimming in separate regions using the driving circuit. Obviously, the more the separate or divided regions for mini-LED backlight, the greater the number of LED lights and the more sophisticated the backlight control. With this backlight technology, LCDs can realize a thin appearance and achieve the display quality with high brightness and ultra-high contrast (achieving pure black). Because of brightness and cost considerations, a plurality of LEDs are currently connected in series in a single region of LEDs for light emission. Once the LED is short-circuited, there may be situations where some lights are burned due to over current or large-area dim lights occur in a divided region, thereby affecting long-term reliability of products. In the present embodiment, by deploying a protective circuit 2 on each branch of the LEDs 11, it is avoided that some lights are burned due to over current or large-area dim lights occur in divided or separate backlight regions 10, caused when the LED 11 is short-circuited. Specifically, a voltage of the output end of the LED 11 is obtained in real time by means of the control module 22, and based on the voltage of the output end of the LED 11, the rectifier module 21 is enabled to moderate the branch current of the LED 11 to maintain the branch current of the LED 11 within a configured range. A close-loop adjustment in real time for the branch current of the LED 11 is realized. Affection of a short-circuited LED 11 on other LEDs 11 in the mini-LED backlight module 1 is avoided.

Hence, the control module 22 obtains the voltage of the output end of the LED 11 in real time and based on the voltage of the output end of the LED 11, enables the rectifier module 21 to moderate or adjust the branch current of the LED 11 to maintain the branch current of the LED 11 within a configured range, thereby realizing the close-loop adjustment in real time for the branch current of the LED 11. Obviously, when the voltage of the output end of the LED 11 is in a normal range, the branch current of the LED 11 is within the configured range. When the LED 11 is short-circuited, the voltage of the output end of the LED increases and this causes an increase of the branch current of the LED 11. At this time, the control module 22 can enable the rectifier module 21 to increase the resistance or flux of the branch of the LED 11 to reduce the branch current of the LED 11 to be within the configured range. The configured range of electric current may be configured depending on actual needs and is not repeated herein.

Figure 3:
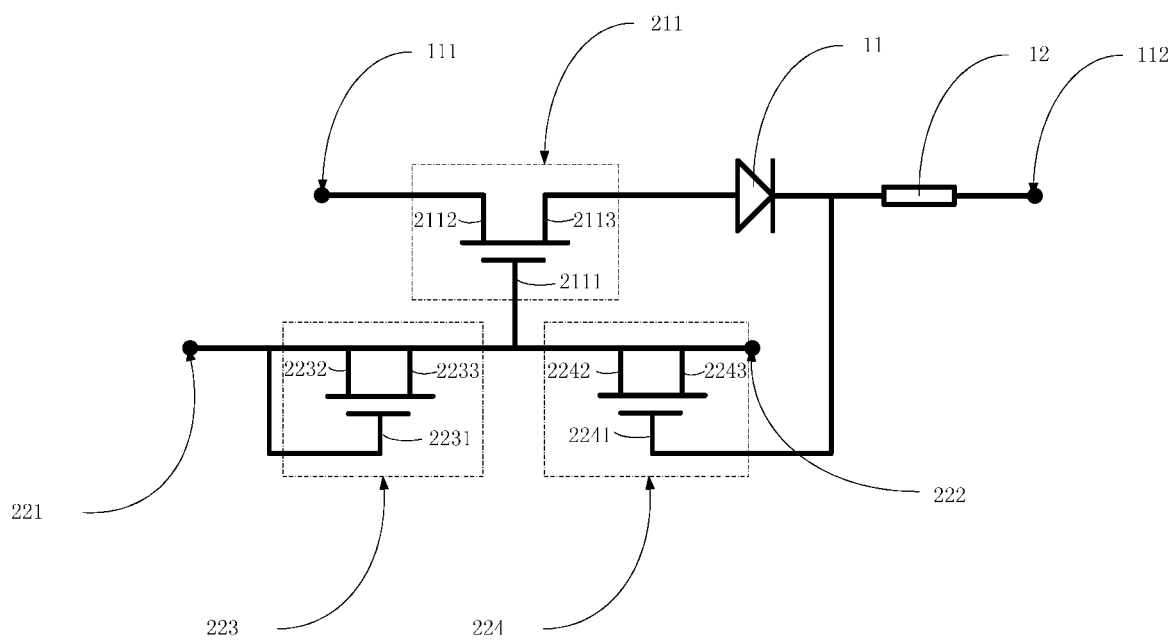
FIG. 3 is a schematic diagram illustrating a first type of protective circuit in an embodiment of the present application.
Figure 4:
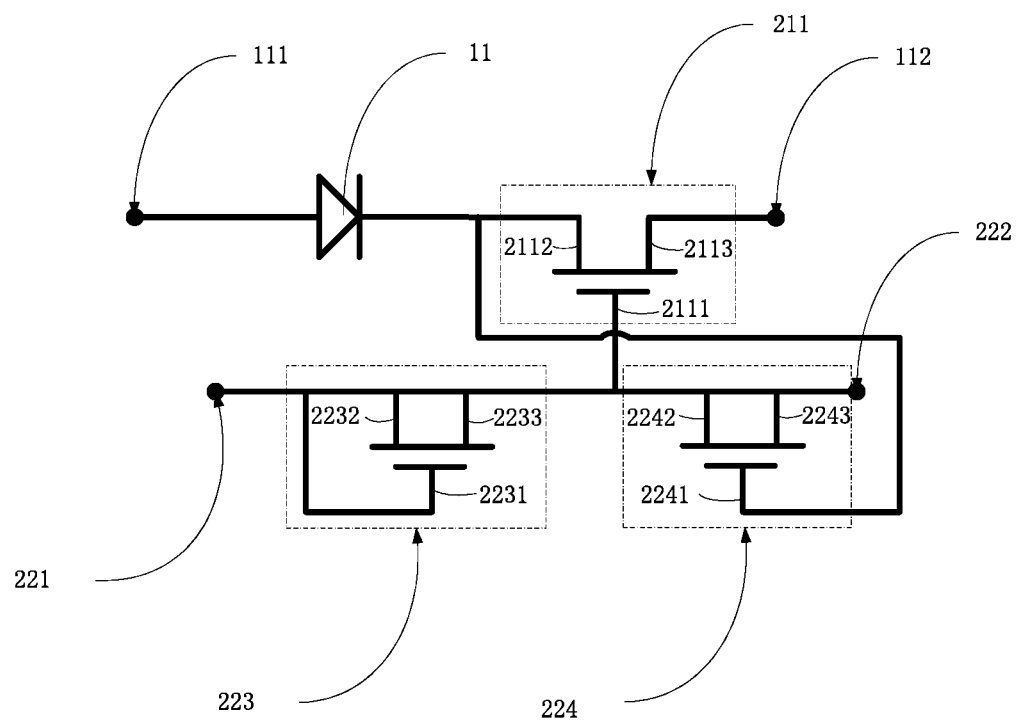
FIG. 4 is a schematic diagram illustrating a second type of protective circuit in an embodiment of the present application.

In an embodiment, as shown in FIGS. 3 and 4, the branch of the LED 11 includes a first high-voltage input end 111 and a first low-voltage output end 112, and the rectifier module 21 may be a variable resistor or a thin-film transistor (TFT). In the present embodiment, the rectifier module 21 includes a first TFT 211, the first TFT 211 and the LED 11 are connected in series between the first high-voltage input end 111 and the first low-voltage output end 112, and a control terminal 2111 of the first TFT 211 is connected to the control module 22. It can be understood that the first control terminal 2111 of the first TFT 211 is the gate of the first TFT 211, and the control module 22 can switch on and off states of the first TFT 211 by controlling the voltage of the first control terminal 2111, thereby realizing rectification control of the branch of the LED 11.

In an embodiment, as shown in FIGS. 3 and 4, the control module 22 includes a second high-voltage input end 221, a second low-voltage output end 222, and a second TFT 223 and a third TFT 224 connected in series between the second high-voltage input 221 end and the second low-voltage output end 222, a second control terminal 2231 of the second TFT 223 is connected to the second high-voltage input end 221, a third control terminal 2241 of the third TFT 224 is connected to the output end of the LED 11, and the first control terminal 2111 is connected to a node between the second TFT 223 and the third TFT 224. Obviously, the second control terminal 2231 of the second TFT 223 is the gate of the second TFT 223 and the third control terminal 2241 is the gate of the third TFT 224. It can be understood that the second control terminal 2231 of the second TFT 223 is connected to the second high-voltage input end, that is, the second TFT 223 is in an on state normally. The third control terminal 2241 of the third TFT 224 is connected to the output end of the LED 11 and the output end of the LED 11 is in a low-voltage state normally, that is, the third TFT 224 is in an off state normally. Obviously, the first control terminal 2111 is connected to the node between the second TFT 223 and the third TFT 224 such that the node located between the second TFT 223 and the third TFT 224 and connected to the first control terminal 2111 is at a high voltage level normally. In such a way, it is ensured that the first TFT 211 is in the on state without affecting a normal use of the LED 11.

In an embodiment, as shown in FIG. 3, a first pin 2112 of the first TFT 211 is connected to the first high-voltage input end 111, a second pin 2113 of the first TFT 211 is connected to an input end of the LED 11, a protective resistor 12 is connected in series between the first low-voltage output end 112 and the output end of the LED 11, and the third control terminal 2241 is connected to a node between the protective resistor 12 and the output end of the LED 11. It can be understood that the first pin 2112 and the second pin 2113 of the first TFT 211 are the source and the drain of the first TFT 211, respectively. The protective resistor 12 can be a resistor with fixed resistance for avoiding an affection on other LEDs 11 in the mini-LED backlight module 1, caused when the LED 11 is short-circuited to generate instantaneous electric current that is too large.

In an embodiment, as shown in FIG. 4, an input end of the LED 11 is connected to the first high-voltage input end 111, the output end of the LED 11 is connected to a first pin 2112 of the first TFT 211, a second pin 2113 of the first TFT 211 is connected to the first low-voltage output end 112, and the third control terminal 2241 is connected to a node between the first TFT 211 and the output end of the LED 11. It can be understood that different from the structure shown in FIG. 3, the first TFT 211 is connected to the output end of the LED 11. In such a way, when the LED 11 is short-circuited, the branch current of the LED 11 is quickly adjusted to be within the configured range under the control of the control module 22. It will not cause instantaneous electric current that is too large when the LED 11 is short-circuited. Accordingly, the protective resistor 12 is needless and this makes the circuit simpler.

In an embodiment, as shown in FIGS. 3 and 4, a third pin 2232 of the second TFT 223 is connected to the second high-voltage input end 221, a fourth pin 2233 of the second TFT 223 is connected to a fifth pin 2242 of the third TFT 224, and a sixth pin 2243 of the third TFT 224 is connected to the second low-voltage output end 222. It can be understood that the third pin 2232 of the second TFT 223 and the fourth pin 22333 of the second TFT 223 are the source and the drain of the second TFT 223, respectively. The fifth pin 2242 of the third TFT 224 and the sixth pin 2243 of the third TFT 224 are the source and the drain of the third TFT 224.

Figure 5:
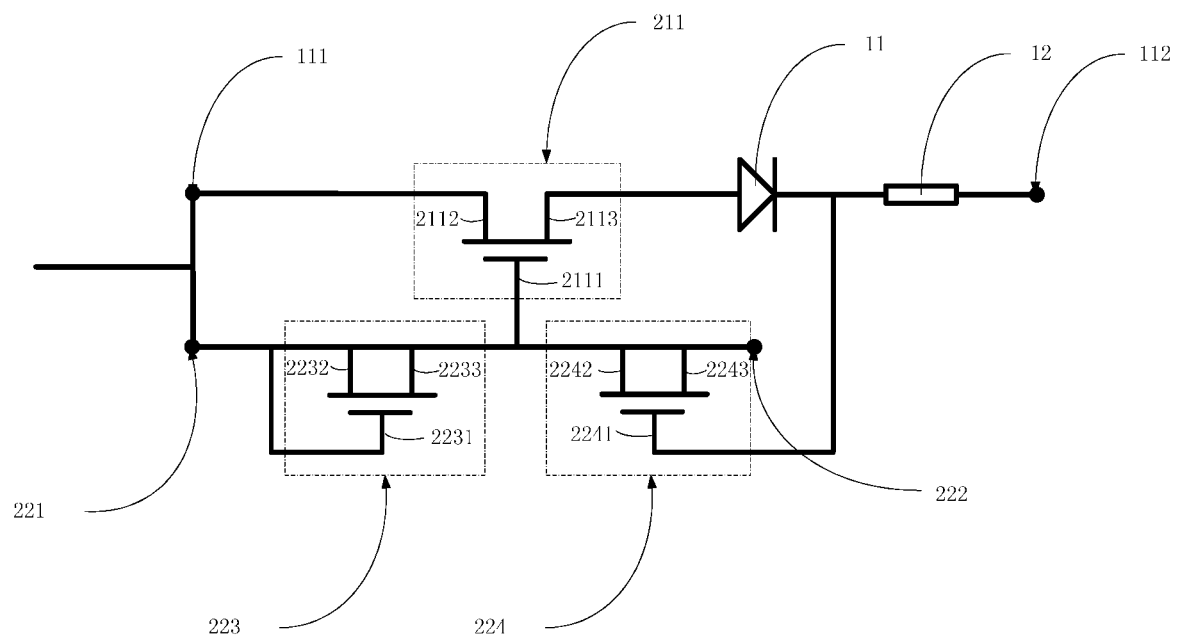
FIG. 5 is a schematic diagram illustrating a third type of protective circuit in an embodiment of the present application.
Figure 6:
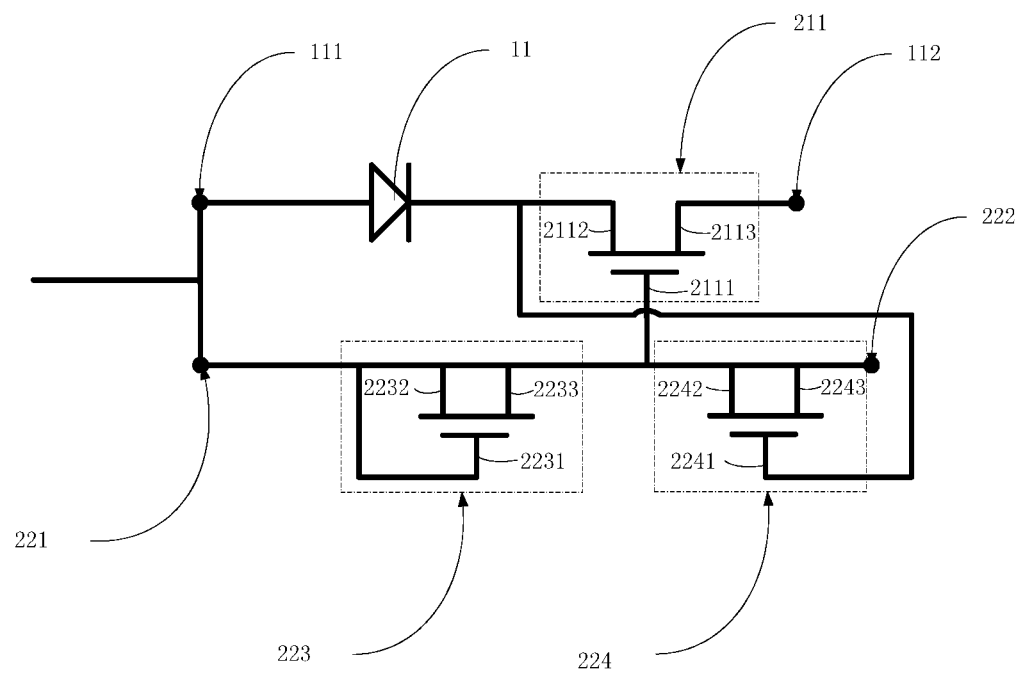
FIG. 6 is a schematic diagram illustrating a fourth type of protective circuit in an embodiment of the present application.

In an embodiment, as shown in FIGS. 5 and 6, the first high-voltage input end 111 and the second high-voltage input end 221 have a same voltage and are connected in parallel. Obviously, connecting the first high-voltage input end 111 and the second high-voltage input end 221 in parallel can further reduce wiring complexity of the mini-LED backlight module 1.

In an embodiment, the two LEDs 11 are connected in parallel, the first low-voltage output end 112 on the branch of one of the two LEDs 11 is connected to the first low-voltage output end 112 on the branch of the other one of the two LEDs 11, and the first high-voltage input end 111 on the branch of one of the two LEDs 11 is connected to the first high-voltage input end 111 on the branch of the other one of the two LEDs 11. In the case that the two LEDs 11 are connected in parallel, it can be understood that when one of the two LEDs 11 is short-circuited, on and off states of the first TFT 211 are adjusted by the control module 22 to realize turning off or slightly turning on the first TFT 211, thereby preventing the other LED 11 from being short-circuited and went out.

In one embodiment, the two LEDs are connected in series, and the first low-voltage output end 112 on the branch of one of the two LEDs 11 is connected to the first high-voltage input end 111 on the branch of the other one of the two LEDs 11. In the case that the two LEDs 11 are connected in series, it can be understood that when one of the two LEDs 11 is short-circuited, on and off states of the first TFT 211 are adjusted by the control module 22 to realize slightly turning on the first TFT 211, thereby preventing the other LED 11 from being damaged due to over current.

It is noted that both the first high-voltage input end 111 and the second high-voltage input end 221 are connected to constant direct-current high voltage and the first low-voltage output end 112 and the second low-voltage output end 222 are connected to constant direct-current low voltage. It can be understood that the control module 22 adjusts on and off states of the first TFT 211, which may include completely turning on, turning off and slightly turning on. Obviously, the on and off states of the first TFT 211 are determined by the voltage of the node between the second TFT 223 and the third TFT 224. Specifically, it may be configured according to a divided voltage between the second TFT 223 and the third TFT 224 under a circumstance that a ratio of the voltage of the second high-voltage input end 221 to the voltage of the second low-voltage output end 222 is fixed. Also, the voltage of the first high-voltage input end 111 and the voltage of the first low-voltage output end 112 may be configured according to the demands on brightness of the LED 11 and required voltage/current.

Figure 7:
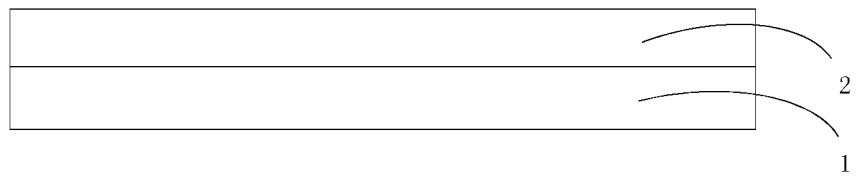
FIG. 7 is a structural schematic diagram illustrating a display device in an embodiment of the present application.

The present application further provides a display device. As shown in FIG. 7, the display device includes a display panel 2 and the afore-described mini-LED backlight module 1. The display panel 2 is disposed at one side of the mini-LED backlight module 1.

Above all, by deploying the protective circuit 20 on each branch of the LEDs 11, it is avoided in the present application that some lights are burned due to over current or large-area dim lights occur in divided or separate backlight regions 10, caused when the LED 11 is short-circuited. Specifically, a voltage of the output end of the LED 11 is obtained in real time by means of the control module 22, and based on the voltage of the output end of the LED 11, the rectifier module 21 is enabled to moderate the branch current of the LED 11 to maintain the branch current of the LED 11 within a configured range. A close-loop adjustment in real time for the branch current of the LED 11 is realized. Affection of a short-circuited LED 11 on other LEDs 11 in the mini-LED backlight module 1 is avoided.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

The invention claimed is:

1. A mini light-emitting diode (mini-LED) backlight module, comprising a plurality of separate backlight regions, each of the separate backlight regions provided with at least two LEDs, each branch of the LEDs connecting to a protective circuit, the protective circuit comprising:
   a rectifier module, connected in series with the LED and configured to moderate a branch current of the LED; and
   a control module, connected to the rectifier module and an output end of the LED, and configured to obtain a voltage of the output end of the LED and based on the voltage of the output end of the LED, to enable the rectifier module to moderate the branch current of the LED to maintain the branch current of the LED within a configured range,
   wherein the branch of the LED comprises a first high-voltage input end and a first low-voltage output end, the rectifier module comprises a first thin-film transistor (TFT), the first TFT and the LED are connected in series between the first high-voltage input end and the first low-voltage output end, and a control terminal of the first TFT is connected to the control module,
   wherein the control module comprises a second high-voltage input end, a second low-voltage output end, and a second TFT and a third TFT connected in series between the second high-voltage input end and the second low-voltage output end, a second control terminal of the second TFT is connected to the second high-voltage input end, a third control terminal of the third TFT is connected to the output end of the LED, and the first control terminal is connected to a node between the second TFT and the third TFT.

2. The mini-LED backlight module according to claim 1, wherein a first pin of the first TFT is connected to the first high-voltage input end, a second pin of the first TFT is connected to an input end of the LED, a protective resistor is connected in series between the first low-voltage output end and the output end of the LED, and the third control terminal is connected to a node between the protective resistor and the output end of the LED.

3. The mini-LED backlight module according to claim 1, wherein an input end of the LED is connected to the first high-voltage input end, the output end of the LED is connected to a first pin of the first TFT, a second pin of the first TFT is connected to the first low-voltage output end, and the third control terminal is connected to a node between the first TFT and the output end of the LED.

4. The mini-LED backlight module according to claim 1, wherein a third pin of the second TFT is connected to the second high-voltage input end, a fourth pin of the second TFT is connected to a fifth pin of the third TFT, and a sixth pin of the third TFT is connected to the second low-voltage output end.

5. The mini-LED backlight module according to claim 1, wherein the first high-voltage input end and the second high-voltage input end have a same voltage and are connected in parallel.

6. The mini-LED backlight module according claim 1, wherein the two LEDs are connected in parallel, the first low-voltage output end on the branch of one of the two LEDs is connected to the first low-voltage output end on the branch of the other one of the two LEDs, and the first high-voltage input end on the branch of one of the two LEDs is connected to the first high-voltage input end on the branch of the other one of the two LEDs.

7. The mini-LED backlight module according to claim 1, wherein the two LEDs are connected in series, and the first low-voltage output end on the branch of one of the two LEDs is connected to the first high-voltage input end on the branch of the other one of the two LEDs.

8. A display device, comprising a display panel and the mini-LED backlight module according to claim 1, wherein the display panel is disposed at a side of the mini-LED backlight module.

9. The display device according to claim 8, wherein a first pin of the first TFT is connected to the first high-voltage input end, a second pin of the first TFT is connected to an input end of the LED, a protective resistor is connected in series between the first low-voltage output end and the output end of the LED, and the third control terminal is connected to a node between the protective resistor and the output end of the LED.

10. The display device according to claim 8, wherein an input end of the LED is connected to the first high-voltage input end, the output end of the LED is connected to a first pin of the first TFT, a second pin of the first TFT is connected to the first low-voltage output end, and the third control terminal is connected to a node between the first TFT and the output end of the LED.

11. The display device according to claim 8, wherein a third pin of the second TFT is connected to the second high-voltage input end, a fourth pin of the second TFT is connected to a fifth pin of the third TFT, and a sixth pin of the third TFT is connected to the second low-voltage output end.

12. The display device according to claim 8, wherein the first high-voltage input end and the second high-voltage input end have a same voltage and are connected in parallel.

13. The display device according to claim 8, wherein the two LEDs are connected in parallel, the first low-voltage output end on the branch of one of the two LEDs is connected to the first low-voltage output end on the branch of the other one of the two LEDs, and the first high-voltage input end on the branch of one of the two LEDs is connected to the first high-voltage input end on the branch of the other one of the two LEDs.

14. The display device according to claim 8, wherein the two LEDs are connected in series, and the first low-voltage output end on the branch of one of the two LEDs is connected to the first high-voltage input end on the branch of the other one of the two LEDs.

* * * * *